United States Patent [19]

Petersen et al.

[11] 3,750,003

[45] July 31, 1973

[54] SWITCHING CIRCUIT FOR INVERTERS AND THE LIKE

[75] Inventors: Harold E. Petersen, Culver City; Richard A. Matthews, Los Angeles, both of Calif.

[73] Assignee: Pedima Corporation, Culver City, Calif.

[22] Filed: June 15, 1972

[21] Appl. No.: 263,122

[52] U.S. Cl. .................... 321/12, 321/34, 321/37, 321/44, 321/46

[51] Int. Cl. .................... H02m 1/18

[58] Field of Search .................... 321/12, 27, 45 R, 321/45 C, 34, 37, 11, 44, 46

[56] References Cited

UNITED STATES PATENTS

| | | | |
|---|---|---|---|
| 3,315,145 | 4/1967 | Menard | 321/45 C |
| 3,569,819 | 3/1971 | Martzloff et al. | 321/12 |
| 3,373,338 | 3/1968 | Corey et al. | 321/27 R |
| 3,408,551 | 10/1968 | Kuba | 321/34 X |

*Primary Examiner*—Gerald Goldberg
*Attorney*—Ford W. Harris, Jr., Walter Eugene Tinsley et al.

[57] ABSTRACT

An improved switching circuit for use in minimizing energy dissipation in DC/AC inverter circuits and the like wherein on/off circuit elements such as transistors are connected in series with a power supply for driving a load connected at a junction point between the transistors, with auxiliary drive means connected to the on/off circuit elements for simultaneously actuating them to become conductive and non-conductive, respectively. Each of two non-coupled inductors are positioned in series with an on/off circuit element on both sides of the junction point, and capacitance means is provided between the junction point and the power supply. A diode is connected in parallel with each inductor and also with the on/off circuit element and inductor on each side of the junction point.

11 Claims, 8 Drawing Figures

FIG. 2.
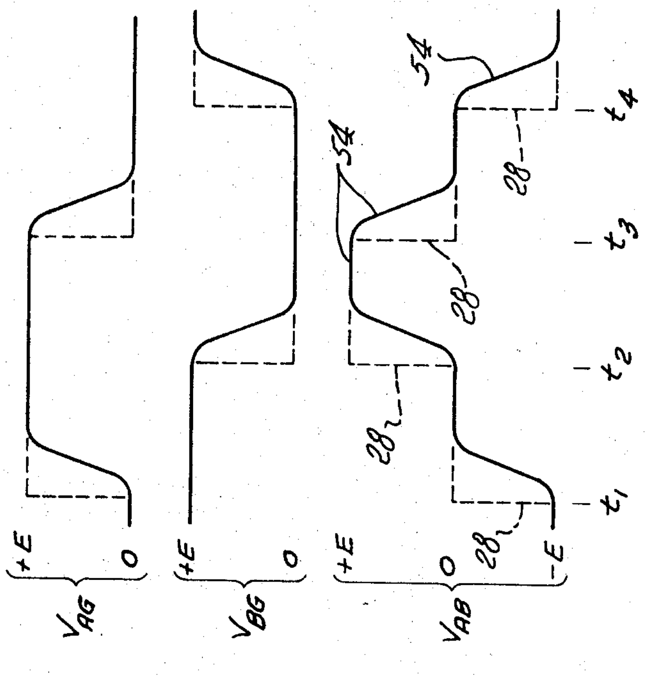
FIG. 6.
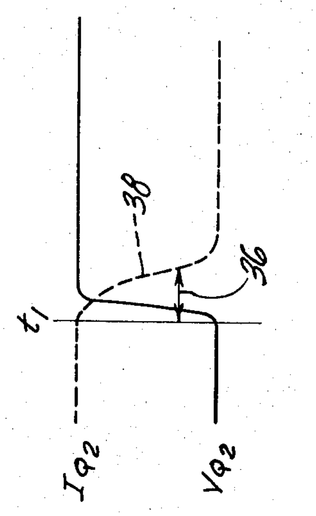
FIG. 1.
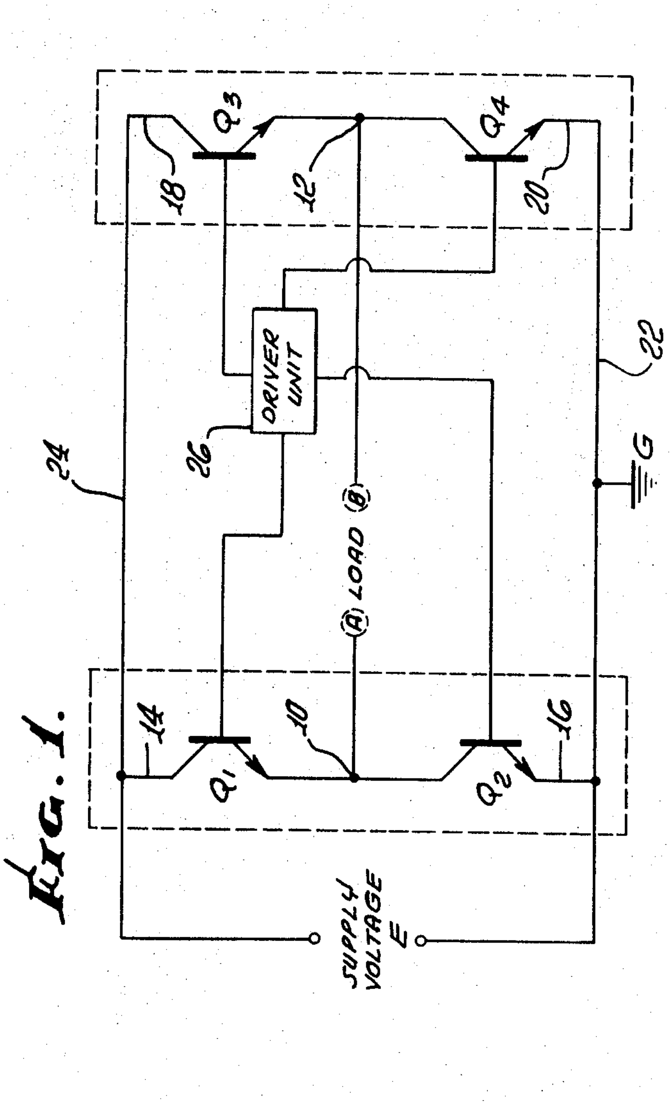
FIG. 8.
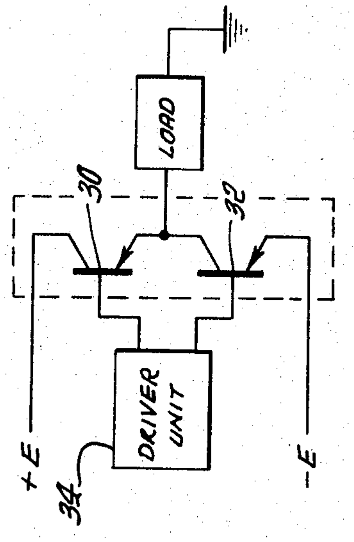
FIG. 3.
| | $t_1$ | $t_2$ | $t_3$ | $t_4$ |
|---|---|---|---|---|
| $Q_1$ | OFF | ON | ON | OFF |
| $Q_2$ | ON | OFF | OFF | ON |
| $Q_3$ | ON | ON | OFF | OFF |
| $Q_4$ | OFF | OFF | ON | ON |

SWITCHING CIRCUIT FOR INVERTERS AND THE LIKE

This invention relates generally to devices for minimizing power dissipation, and more particularly to an improved switching circuit for inverters and the like which prevents on/off circuit elements such as transistors connected in series with a power supply from becoming damaged through near short-circuiting and the resulting undue power dissipation at the time an auxiliary control or driving circuit simultaneously actuates the transistors to become conductive and non-conductive, respectively.

As used herein in the written description and claims the terms "on/off" and "conductive/non-conductive" are used in their relative meaning as well as their literal meaning to identify a pair of circuit elements in series which are simultaneously rendered substantially more conductive and less conductive, respectively. In other words, it is not necessary for the on/off circuit elements to be rendered completely conductive or non-conductive in order to utilize the circuitry of the present invention. Similarly, the phrase "short-circuit" in the specification and claims is used to refer to circuits having a relatively low impedance as well as circuits having no measurable or appreciable impedance.

There are a variety of switching circuits which utilize on/off circuit elements in series with a power supply wherein one such circuit element is rendered conductive while the adjacent one is rendered non-conductive. There is always the danger in such circuits that one on/off element will not be rendered completely non-conductive before the other becomes conductive, thereby resulting in a temporary but instantaneous short-circuit which often dissipates undue energy and burns out one or both of the on/off circuit elements. Such a problem is particularly troublesome with respect to DC/AC inverter circuits where it is desirable to avoid the inefficiency and complications of self-commutating circuits and employ instead a simple single-drive auxiliary control circuit for simultaneously rendering different pairs of adjacent transistors conductive and non-conductive, respectively. In this regard, there presently exists no efficient and effective way of solving the short-circuiting problem without having to modify the auxiliary control circuit in order to slightly space apart the actuation of adjacent transistors in series. The corrective circuitry used in self-communicating systems utilizing SCR's rather than transistor systems, as for example, shown in U.S. Pat. No. 3,569,819 covering "Recovery System for Short Circuits Through Switching Devices in Power Circuits" is not applicable to the switching circuits of the present invention.

It is therefore a primary object of the present invention to provide an improved switching apparatus for use in a circuit having the aforementioned characteristics which assures the advantages of a conventional auxiliary control or driving circuit for simultaneously driving one transistor non-conductive while at the same time minimizing the risk that any damaging short-circuiting will result because of any recombination time or the like which may be necessary to render the transistor or equivalent circuit element completely non-conductive.

It is another primary object to provide an improved switching device for use in a circuit having the aforementioned characteristics which minimizes power dissipation in both transistors during the on/off transition period, and which successfully operates over a wide range of inductive, capacitive or resistive loads. It is a related object to provide corrective circuitry which itself dissipates only minimal energy and which is inexpensive and relatively trouble-free in operation.

More specifically, it is an object of the invention to provide switching circuitry which can be used with a DC/AC inverter having a first pair of series transistors connected in parallel with a second pair of series transistors to a DC power supply, and having a load connected between the junctions of each pair of series transistors.

Another specific object is to provide switching circuitry having the aforementioned characteristics wherein an inductor is connected in series with each of the transistors on the same side of the load junction as the transistors, with a capacitor connected in parallel with each line containing a transistor and its adjacent inductor. A related object is to additionally provide a diode connected in parallel with each line containing a transistor and its adjacent inductor, as well as a diode connected in parallel with each such inductor, with each of the diodes oriented to allow current to pass in the direction toward the positive terminal of the power supply.

Further objects, features, and advantages of the invention will be evident to those skilled in the art from the following description of a preferred embodiment of the invention.

In the drawings:

FIG. 1 shows a conventional DC/AC inverter circuit of the type to which the present invention is directly applicable;

FIG. 2 shows the modified wave-form which results from incorporating the present invention into the inverter circuit of FIG. 1;

FIG. 3 shows the sequential switching pattern for generating the alternating current of FIG. 2;

FIG. 6 shows a typical voltage and current curve generated without employing the circuitry of the invention;

FIG. 8 shows an amplifier circuit which is also suitable for modification with the circuitry of the invention.

Figure 5:
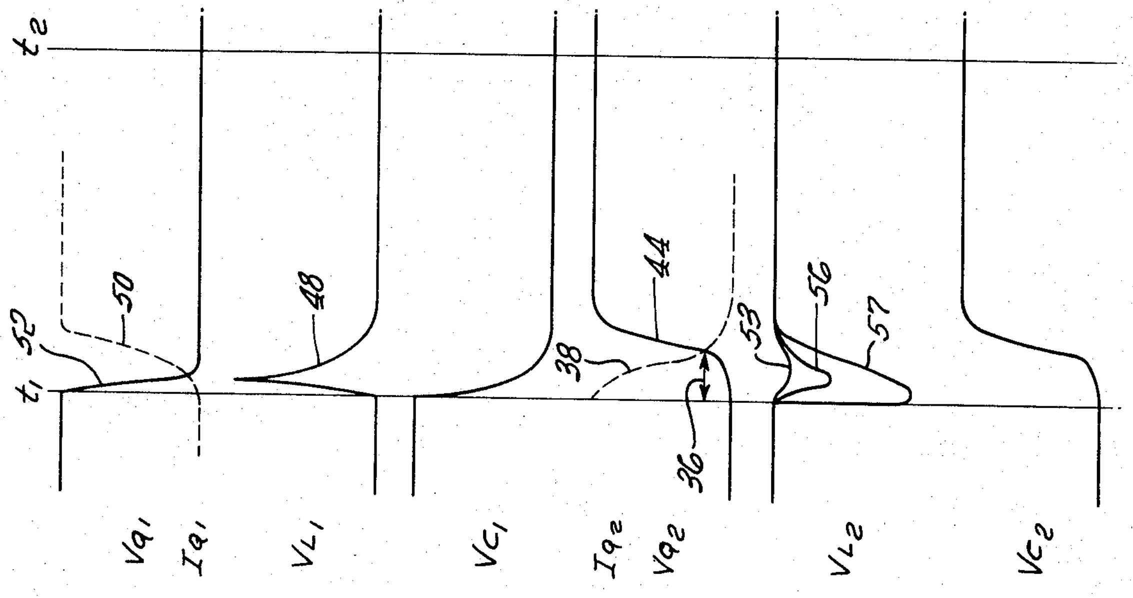
FIG. 5 is a timing diagram showing an exemplary cycle of the voltage and current curves of the circuit portion of FIG. 4.

Referring to FIGS. 1 through 3, an exemplary circuit is shown of the type which incorporates two on/off circuit elements such as transistors $Q_1$ and $Q_2$ in series with a power supply such as a DC battery. One side of a load is connected to a junction point 10 between the transistors $Q_1$ and $Q_2$ while the other side of the load is connected to a second junction point 12 between two other circuit elements such as transistors $Q_3$ and $Q_4$ which are also connected in series with the power supply. Thus, a line 14, 16 containing transistors $Q_1$ and $Q_2$ is connected in parallel with another line 18, 20 containing transistors $Q_3$ and $Q_4$ between a ground line 22 of the power supply and a positive voltage line 24 carrying, for example, about 150 volts. By connecting a conventional drive unit 26 to the base of each of the transistors $Q_1$, $Q_2$, $Q_3$ and $Q_4$, and by actuating the transistors one pair at a time to each simultaneously become conductive and non-conductive, respectively, it is possible to generate by conventional and known means and methods an alternating current square wave as shown by the exemplary dashed line curve 28 in FIG. 2.

In actual practice, however, the transistors do not operate instantaneously, particularly with respect to the recombination time which is required whenever the transistor is actuated to be non-conductive. Therefore, under certain load conditions, series transistors such as $Q_1$ and $Q_2$ may become temporarily short-circuited, as for example at time $t_1$ and $Q_1$ may become conductive before the recombination time for making $Q_2$ completely non-conductive has passed. Such short-circuiting often dissipates sufficient energy through line 14, 16 to completely destroy the transistor. Under the circumstances, it is highly desirable to solve the problem in order to be able to continue to employ the highly efficient control which is otherwise provided by applying only low power signals to the base of the transistors, and in view of the very low voltage drop across the transistors while they are working in a saturated switching mode. Even if the transistors are not endangered, it is important to minimize the energy dissipated during the transition on/off period, both with respect to the transistor being rendered conductive (on) as well as the transistor being rendered non-conductive (off).

Referring to FIG. 8, similar problems arise with respect to an amplifier circuit where series transistors such as 30, 32 may be actuated simultaneously by a drive circuit 34 thereby creating the same short circuiting risk which regularly arises with the previously described inverter circuit. Another typical circuit to which the invention is directly applicable is a simplifed DC/AC inverter having one terminal of the load connected directly back into the center of the power supply. Such a circuit generates a more conventional square wave AC rather than the illustrated stepped voltage wave of FIG. 2. These practical applications for the present invention are given by way of example only since there are numerous equivalent situations where it is desirable to minimize the risk of undue power dissipation and of short-circuiting through simultaneous on and off switching of series circuit elements such as transistors, gate-controlled switches, relays and the like in a simple, reliable, efficient and expeditious way.

Figure 4:
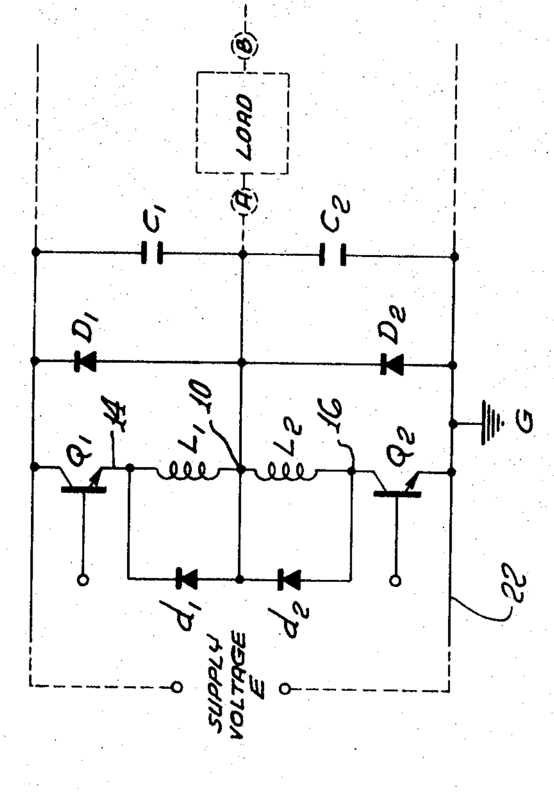
FIG. 4 is a detailed circuit diagram of one of the dotted-line portions of FIG. 1 showing an exemplary portion of a presently preferred embodiment of the invention.
Figure 7:
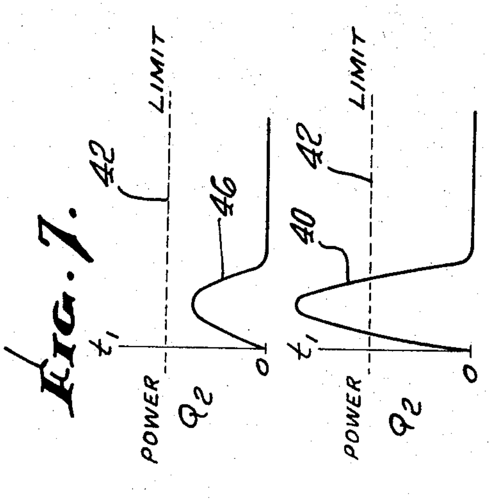
FIG. 7 shows exemplary power curves for a transistor rendered non-conductive, both with and without employing the circuitry of the invention.

Referring more specifically to the exemplary circuit diagram of FIG. 4, it is desirable to utilize an inductor $L_1$ in line 14 in series with and on the same side of the junction point 10 as, transistor $Q_1$. Similarly, an inductor $L_2$ is included in line 16 in series with transistor $Q_2$. A capacitor $C_1$ is connected in parallel with line 14 and a capacitor $C_2$ is connected in parallel with line 16. By providing only one of capacitors $C_1$ or $C_2$ connected between the junction point 10 and the power supply, the advantages of the invention can be utilized under some load conditions to avoid undue power dissipation through the transistor which because of recombination or the like is not rendered immediately non-conductive. For example, at time $t_1$ when transistor $Q_1$ is actuated by the drive unit 26 to become conductive at the same time $Q_2$ is actuated to become non-conductive, there is a recombination time 36 required before $Q_2$ actually becomes non-conductive and stops passing current as represented by curve 38 in FIG. 5. If during this period of time the voltage across $Q_2$ would be allowed to rise as shown by the solid line in FIG. 6, the resulting power dissipation through $Q_2$ as represented by the curve 40 in FIG. 7 might exceed the inherent power limit shown at 42 and thereby burn out the transistor $Q_2$. However the combined effect of one of the capacitors $C_1$ or $C_2$ and the inductor $L_2$ serve to delay the voltage build-up as shown by curve 44 until the critical recombination time has passed, thus avoiding the undesirable power dissipation measured by the current voltage product that would otherwise occur. Under such circumstances, the circuitry of the invention keeps the power dissipation through $Q_2$ as represented by the curve 46 below the power limit 42 of such transistor. Of course, there is a greater tendency for undue power dissipation with loads which run on a higher current drawn through the transistors during the conducting period.

It is important to note that when $Q_1$ is rendered conductive, the self-induced voltage represented by the curve 48 in FIG. 5 tends to initially oppose the passage of current through $Q_1$ as shown by curve 50, thereby minimizing the current-voltage power dissipation through $Q_1$ since the voltage across $Q_1$ as represented by curve 52 has gone down to only a nominal value by the time current passes at a substantial rate through $Q_1$. Thus, power dissipation is minimized at the transistor being rendered conductive as well as the transistor being rendered non-conductive.

However, in order to make the switching circuit of the invention applicable for wide ranges of capacitive inductive and resistive loads, it is desirable to incorporate a diode $D_2$ in parallel with line 16. This serves, among other things, to decrease the power dissipation during the switching by decreasing the negative voltage induced across inductor $L_2$ as shown by curve 56. Additional benefits are also obtained by adding diode $d_2$ in parallel with $L_2$ in order to allow a path for dissipation of energy stored in $L_2$ and thereby further reducing the energy dissipation as shown in curve 53. The curve 57 represents the higher voltage induced across $L_2$ after the switching at time $t_1$ in a circuit not including diodes $D_2$ and $d_2$. In this regard, the diodes are all oriented to allow passage of current in the direction toward the positive voltage line from the power supply.

Also, in the preferred form of the invention, it is possible to make the switching circuitry substantially independent of the impedance in the other parts of the circuit by employing both capacitors $C_1$ and $C_2$ rather than just one of them. It is to be noted that $C_1$ and $C_2$ can be increased to further slow down the rate of voltage rise across $Q_1$ and $Q_2$, respectively, when such transistors are rendered non-conductive, but not without limit since new problems may be created. For example, if $C_1$ is too large, it will store an excessive charge during the period of time before $t_1$ such that when $Q_1$ is closed at $t_1$, the discharge of such charge through $Q_1$ might exceed its limitations and burn it out. Similarly, $L_1$ and $L_2$ may be increased, but with larger values comes a higher resistance and reduced efficiency. Some wave shaping can be accomplished by appropriate choices of $L_1$, $L_2$, $C_1$, and $C_2$, as shown by the exaggerated exemplary alternating current output shown by curve 54 in FIG. 2.

The foregoing detailed circuit description applies similarly to each part of the circuit at various times during the exemplary sequential switching pattern of FIG. 3, depending on whether the particular transistor involved is being rendered conductive or non-conductive. It is to be noted that the portion of the circuit shown in FIG. 4 having transistors $Q_1$ and $Q_2$ in series can be utilized separate and apart from the corresponding circuit including transistors $Q_3$ and $Q_4$ in series. For example, the circuit of FIG. 4 can be substituted directly in the dotted line portion of FIG. 8.

It is to be emphasized that the various curves shown in FIGS. 2, 5, 6 and 7 are included for qualitative illustration only and are not intended to show actual magnitudes or to show precise shaping or actual relative relationships which occur in actual circuits. Similarly, the various power dissipation through resistive voltage drops throughout the circuit have been considered negligible for purposes of disclosing an illustrative embodiment of the invention.

The inventors have built prototypes incorporating the circuitry of the invention and obtained satisfactory operational results for a variety of loads, all with minimum power dissipation during the switching operation and all without burning out any transistors. More particularly, a 150 volt DC supply voltage was used to generate an alternating current for loads using up to 2 kilowatts of power and having current surges between 25 and 75 amperes. In such prototype circuit, inductors $L_1$, $L_2$, $L_3$ and $L_4$ of 250 microhenries were used; capacitors $C_1$, $C_2$, $C_3$ and $C_4$ of 2 microfarads were employed, each of transistors $Q_1$, $Q_2$, $Q_3$ and $Q_4$ included three transistors 2N5155 connected in parallel; and diodes MR754 were used for each of the diodes $D_1$, $D_2$, $D_3$ and $D_4$ as well as diodes $d_1$, $d_2$, $d_3$ and $d_4$.

It will therefore be appreciated to those skilled in the art that the present invention combines known circuit elements in a unique, novel and unobvious way to obtain surprising results in terms of efficient and trouble-free operation for a wide range of inductive, capacitive and resistive loads, all without having to change the simple single-drive control unit which simultaneously renders the adjacent transistors in series conductive and non-conductive, respectively.

Although an exemplary embodiment of the invention has been disclosed and discussed, it will be understood that other applications of the invention are possible, and that the embodiment disclosed may be subjected to various changes, modifications, and substitutions without necessarily departing from the spirit of the invention.

We claim as our invention:

1. An electrical circuit of the type having first and second on/off circuit elements capable of being switched on and off by an external control signal, connected in series with a power supply, with auxiliary drive means connected to said on/off circuit elements for simultaneously actuating them to become conductive and non-conductive, respectively, and with a load connected at a first junction point between said on/off circuit elements, wherein the improvement comprises:

a first inductor in series with said first on/off circuit element, said first inductor and said first on/off circuit element both being on the same side of said first junction point;

a second inductor in series with said second on/off circuit element, said second inductor and said second on/off circuit element both being on the same side of said first junction, with said second inductor being uncoupled relative to said first inductor; and first capacitive means connected between said power supply and said first junction point.

2. The electrical circuit of claim 1 including a first diode connected in parallel with said first on/off circuit element and said first inductor, and a second diode connected in parallel with said second on/off circuit element and said second inductor, said first and second diodes being oriented to allow current to pass in a direction toward a positive voltage terminal of said power supply.

3. The electrical circuit of claim 1 including a diode connected in parallel with said first inductor, and another diode connected in parallel with said second inductor, said diodes being oriented to allow current to pass in a direction toward a positive voltage terminal of said power supply.

4. The electrical circuit of claim 1 wherein said first capacitive means includes a capacitor connected in parallel with said first inductor and said first on/off circuit element, and another capacitor connected in parallel with said second inductor and said second on/off circuit element.

5. The electrical circuit of claim 1 having third and fourth on/off circuit elements capable of being switched on and off by an external control signal, connected in series with said power supply and in parallel with said first and second on/off circuit elements, with said auxiliary drive means connected to said third and fourth on/off circuit elements for simultaneously actuating them to become non-conductive and conductive, respectively, and with said load connected at a second junction point between said third and fourth on/off circuit elements, and including;

a third inductor in series with said third on/off circuit element, said third inductor and said third on/off circuit element both being on the same side of said second junction point;

a fourth inductor in series with said fourth on/off circuit element, said fourth inductor and said fourth on/off circuit element both being on the same side of said second junction point, with said third inductor being uncoupled relative to said fourth inductor; and second capacitive means connected between said power supply and said second junction.

6. An electrical switching circuit of the type having first and second on/off circuit elements capable of being switched on and off by an external control signal, connected in series with a power supply, with auxiliary drive means connected to said on/off circuit elements for simultaneously actuating them to become conductive and non-conductive, respectively, and with a load connected at a junction point between said on/off circuit elements, wherein the improvement comprises:

a first inductor in series with said first on/off circuit element, said first inductor and said first on/off circuit element both being in a first line on the same side of said junction point;

a second inductor in series with said second on/off circuit element, said second inductor and said second on/off circuit element both being in a second line on the same side of said junction point, with said second inductor being uncoupled relative to said first inductor;

first and second capacitors connected in parallel with said first and second lines, respectively;
first and second diodes connected in parallel with said first and second lines, respectively; and
third and fourth diodes connected in parallel with said first and second inductors, respectively, with said first, second, third, and fourth diodes all being oriented to allow current to pass in a direction toward a positive voltage terminal of said power supply.

7. In an inverter circuit wherein a first line with a first transistor is connected through a first junction point to a second line with a second transistor, a third line with a third transistor is connected in series through a second junction point to a fourth line with a fourth transistor, said first and second transistors being connected in parallel with said third and fourth transistors to a DC power supply, with auxiliary drive means connected to said transistors for simultaneously actuating said transistors in series to become connected between said first and second junction points, the improvement comprising:
first, second, third, and fourth inductors connected in series with and on the same lines as said first, second, third, and fourth transistors, respectively, said inductors being uncoupled relative to each other;
first capacitive means connected between said power supply and said first junction point; and
second capacitive means connected between said power supply and said second junction point.

8. The inverter circuit of claim 7 including a diode connected in parallel with each of said first, second, third, and fourth lines, respectively, and with said transistor and inductor contained therein.

9. The inverter circuit of claim 7 including a diode connected in parallel with each of said four inductors, respectively.

10. The inverter circuit of claim 7 wherein said first capacitive means includes a capacitor connected in parallel with each of said first and second lines, respectively, and with said transistor and inductor contained therein, and said second capacitive means includes a capacitor connected in parallel with each of said third and fourth lines, respectively, and with said transistor and inductor contained therein.

11. In an inverter circuit wherein a first line with a first transistor is connected in series through a first junction point to a second line with a second transistor, a third line with a third transistor is connected in series through a second junction to a fourth line with a fourth transistor, said first and second transistors being connected in parallel with said third and fourth transistors to a DC power supply, with auxiliary drive means connected to said transistors for simultaneously actuating said transistors in one line to become conductive and nonconductive, respectively, and with a load connected between said first and second junction points, the improvement comprising:
an inductor connected in series with and on the same lines as each of said transistors, respectively, with each of said inductors being uncoupled with respect to each other inductor;
a diode connected in parallel with each of said lines, respectively, and with said transistor and inductor contained therein;
a capacitor connected in parallel with each of said lines, respectively, and with said transistor and inductor contained therein; and
a diode connected in parallel with each of said inductors, respectively.

* * * * *